(12) United States Patent
Ko

(10) Patent No.: US 12,209,661 B2
(45) Date of Patent: Jan. 28, 2025

(54) ELECTROMECHANICAL PARKING LOCK ACTUATOR

(71) Applicant: Futronic Co., Ltd., Busan (KR)

(72) Inventor: Jinho Ko, Busan (KR)

(73) Assignee: Futronic Co., Ltd., Busan (KR)

( * ) Notice: Subject to any disclaimer, the term of this patent is extended or adjusted under 35 U.S.C. 154(b) by 0 days.

(21) Appl. No.: 18/639,721

(22) Filed: Apr. 18, 2024

(65) Prior Publication Data

US 2024/0384790 A1    Nov. 21, 2024

(30) Foreign Application Priority Data

May 16, 2023  (KR) .................. 10-2023-0063165

(51) Int. Cl.
F16H 63/34    (2006.01)
(52) U.S. Cl.
CPC ..... *F16H 63/3466* (2013.01); *F16H 63/3491* (2013.01)
(58) Field of Classification Search
CPC ..................... F16H 63/3466; F16H 63/3491
See application file for complete search history.

(56) References Cited

U.S. PATENT DOCUMENTS

| | | | |
|---|---|---|---|
| 2017/0307081 A1* | 10/2017 | Rodrigues | B60T 1/005 |
| 2018/0172155 A1* | 6/2018 | Spratte | B60T 1/062 |
| 2018/0320787 A1* | 11/2018 | Ljulj | F16H 63/3491 |
| 2019/0136960 A1* | 5/2019 | Su | F16H 57/029 |
| 2019/0136974 A1* | 5/2019 | Li | F16H 57/039 |
| 2019/0262989 A1* | 8/2019 | Cui | B25J 9/126 |
| 2019/0338853 A1* | 11/2019 | Boralkar | B60T 7/22 |
| 2020/0103024 A1* | 4/2020 | Jeon | F16H 63/3425 |

FOREIGN PATENT DOCUMENTS

| | | | | |
|---|---|---|---|---|
| CN | 110778712 A | * | 2/2020 | B60T 13/74 |
| CN | 111396550 A | * | 7/2020 | |
| CN | 113833848 A | * | 12/2021 | |

* cited by examiner

*Primary Examiner* — Lori Wu
(74) *Attorney, Agent, or Firm* — United One Law Group LLC; Kongsik Kim; Jhongwoo Peck

(57) ABSTRACT

An electromechanical parking lock actuator includes a housing; a drive motor mounted within the housing and configured to generate rotational power; a reducer provided in a planetary gear form and configured such that one side thereof is mounted on the drive motor and it reduces the output speed of the drive motor; a movement unit provided on the other side of the reducer and configured to convert the movement of a movement member into straight-line movement by using the rotational power of the drive motor; and a printed circuit board provided with a controller. The movement unit includes a movement member configured to move in a straight line as the output shaft of the reducer is rotated, and a guide part configured to guide the movement member through straight-line movement while preventing the rotation of the movement member.

10 Claims, 5 Drawing Sheets

ELECTROMECHANICAL PARKING LOCK ACTUATOR

CROSS-REFERENCE TO RELATED APPLICATION

This application claims priority from Korean Application No. 10-2023-0063165 filed May 16, 2023, which is incorporated herein by reference in its entirety.

BACKGROUND

1. Technical Field

The present invention relates to a parking lock actuator. More specifically, present relates the invention to an electromechanical parking lock actuator that can be reduced in size and conveniently installed by arranging a motor, a reducer, and a movement unit in series and is equipped with the function of releasing a parking lock in an emergency.

2. Description of the Related Art

A parking lock actuator is used in a parking lock device that physically restrains the operation of a drive train, such as the transmission or reducer of a vehicle, to prevent the vehicle from moving when the vehicle is parked on an inclined road. A typical parking lock device includes the parking lock gear of a transmission or reducer, a parking latch configured to engage with the parking lock gear, and a parking lock actuator configured to operate a parking latch. The parking latch engages with the parking lock gear by the operation of the parking lock actuator, thereby preventing the movement of a vehicle in a parked state. When the vehicle is changed from a parked state to a driving state, the parking latch is moved from the parking lock gear to an unlocked position by the operation of the parking lock actuator, thereby enabling the vehicle to drive.

Recently, as the spread of electric vehicles increases, electromechanical parking lock actuators that operate a parking latch in an electromechanical manner rather than a mechanical manner are being widely applied.

RELATED ART DOCUMENT

Patent document: Korean Patent Application Publication No. 10-2021-0047809 published on Apr. 30, 2021

SUMMARY

An object of the present invention is to provide an electromechanical parking lock actuator that can be applied to an automatic transmission vehicle or an electric vehicle and consumes a small amount of power by using a drive motor and a reducer.

Another object of the present invention is to provide a parking lock actuator whose size is reduced by moving a movement unit in a straight line using rotational power through the reducer and arranging the drive motor, the reducer, and the movement unit in series.

Still another object of the present invention is to provide a parking lock actuator equipped with an emergency unlock function that can rotate a rotation shaft to an unlocked position by forcibly rotating the rotation shaft of the drive motor in an emergency.

The objects to be achieved by the present invention are not limited to the objects described above, and other objects not described above will be clearly understood by those skilled in the art from the following description.

According to an aspect of the present invention, there is provided an electromechanical parking lock actuator, including: a housing; a drive motor mounted within the housing, and configured to generate rotational power; a reducer provided in a planetary gear form, and configured such that one side thereof is mounted on the drive motor and it reduces the output speed of the drive motor; a movement unit provided on the other side of the reducer, and configured to convert the movement of a movement member into straight-line movement by using the rotational power of the drive motor; and a printed circuit board provided with a controller that controls the output of the drive motor; wherein the movement unit includes a movement member configured to moves in a straight line as the output shaft of the reducer is rotated, and a guide part configured to guide the movement member through straight-line movement while preventing the rotation of the movement member.

The drive motor, the reducer, and the movement unit may be arranged on the same axis.

The guide part may include a guide shaft provided with a thread on the outer peripheral surface thereof, and a guide support configured to support the guide shaft at both ends of the guide shaft and also configured such that one side thereof is coupled to the other side of the reducer; the guide shaft may pass through the guide support, may be connected to the output shaft of the reducer, and may rotate; and the movement member may move in a straight line on the guide shaft as the guide shaft is rotated.

The guide part may further include an auxiliary shaft disposed parallel to the guide shaft and configured to guide the movement member through straight-line movement while preventing the rotation of the movement member.

Springs may be provided on the insides of both ends of the guide support for supporting the guide shaft, respectively.

The electromechanical parking lock actuator may further include a motor mounting part configured to mount the drive motor within the housing and provided with a power supply connector for supplying power to the drive motor, and the power supply connector may be inserted and mounted into and in a terminal that is provided on the printed circuit board.

According to another aspect of the present invention, there is provided an electromechanical parking lock actuator, including: a housing; a drive motor mounted within the housing, and configured to generate rotational power; a reducer provided in a planetary gear form, and configured such that one side thereof is mounted on the drive motor and it reduces the output speed of the drive motor; a movement unit provided on the other side of the reducer, and configured to convert the movement of a movement member into straight-line movement by using the rotational power of the drive motor; a rotation shaft coupled to the movement member in a gear coupling manner, and configured to be rotated by the movement of the movement member; and an emergency unlocking unit configured to rotate the rotation shaft to a unlocked position by forcibly rotating the rotation shaft of the drive motor in an emergency.

The emergency unlocking unit may include: a through hole formed on one side of the housing where the drive motor is disposed, and configured such that the rotation shaft of the drive motor is exposed therethrough; a detachable stopper configured to selectively close and expose the through hole; and an engagement shape part provided on the head of the rotation shaft of the drive motor, and configured to be coupled with an external tool.

A sealing member may be provided between the through hole and the stopper to provide sealing.

The engagement shape part may have a straight or cross cut shape into which the external tool is fitted.

According to an embodiment of the present invention, the parking lock actuator can rotate the parking latch by moving the movement unit with a small amount of power using the drive motor and the reducer.

Furthermore, the overall size of the parking lock actuator can be achieved by moving the movement member of the movement unit in a straight line using rotational power through the reducer and arranging the drive motor, the reducer, and the movement unit in series.

Moreover, in an emergency, the rotation shaft can be rotated to an unlocked position by simply inserting a tool from the housing cover and forcibly rotating the rotation shaft of the drive motor even with a small amount of force.

The advantages of the present invention are not limited to the advantages described above, and other advantages not described above will be clearly understood by those skilled in the art from the following description.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
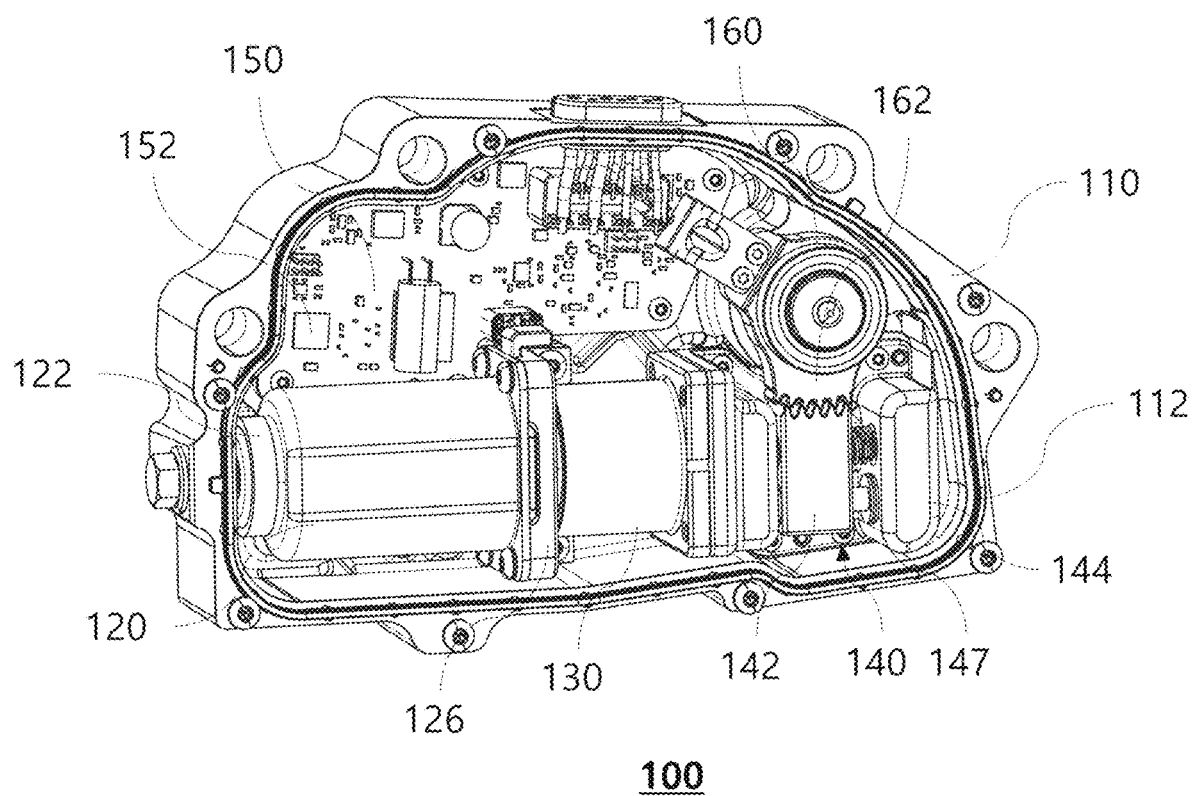
FIG. 1 is a perspective view of an electromechanical parking lock actuator according to an embodiment of the present invention.

Embodiments of the present invention will be described in detail below with reference to the accompanying drawings so that those having ordinary skill in the art to which the present invention pertains can easily implement the present invention. However, the present invention may be implemented in many different forms and is not limited to the embodiments described herein. Furthermore, in order to clearly illustrate the embodiments of the present invention in the drawings, parts unrelated to the description of the present invention will be omitted.

The terms used herein are merely used to describe specific embodiments and are not intended to limit the present invention. Singular expressions may include plural expressions, unless the context clearly indicates otherwise.

In the present specification, it should be understood that the terms such as "include," "have," or "be provided with" are intended to designate the presence of features, numbers, steps, operations, components, parts, or combinations thereof described in the specification and they do not preclude the possibility of the presence or addition of one or more other features, numbers, steps, operations, components, parts, or combinations thereof.

Furthermore, the components appearing in the embodiments of the present invention are shown independently to show the different characteristic functions thereof, and this does not mean that each of the components is composed of separate hardware or a single software component. That is, the individual components are listed and described as separate components for convenience of description. At least two of the individual components may be combined into one component, or one component may be divided into a plurality of components to perform a function. Embodiments including such an integrated component or such separate components are also included in the scope of the present invention as long as they do not depart from the essence of the present invention.

Furthermore, the following embodiments are presented to provide a clearer description to those skilled in the art, and the shapes and sizes of components in the drawings may be exaggerated for the clearer description.

The embodiments according to the present invention will be described in detail below with reference to the accompanying drawings.

Figure 2:
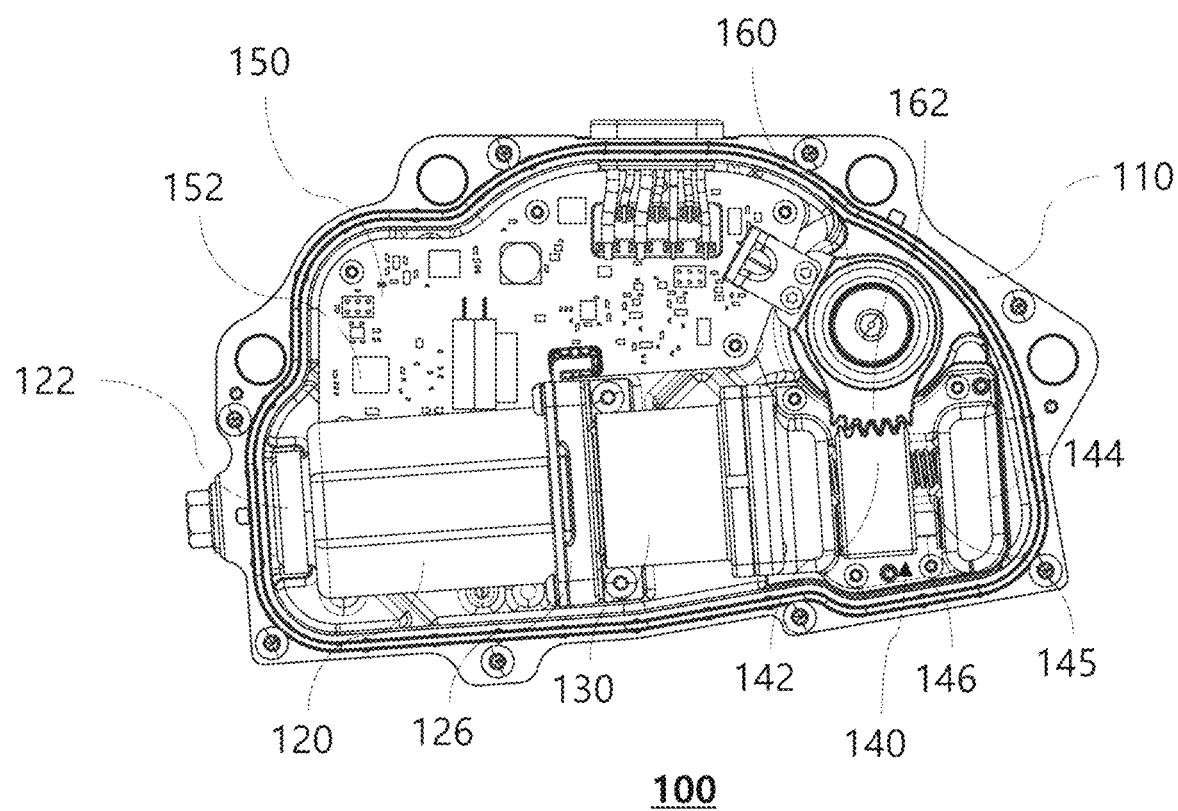
FIG. 2 is a plan view of the electromechanical parking lock actuator of FIG. 1.
Figure 3:
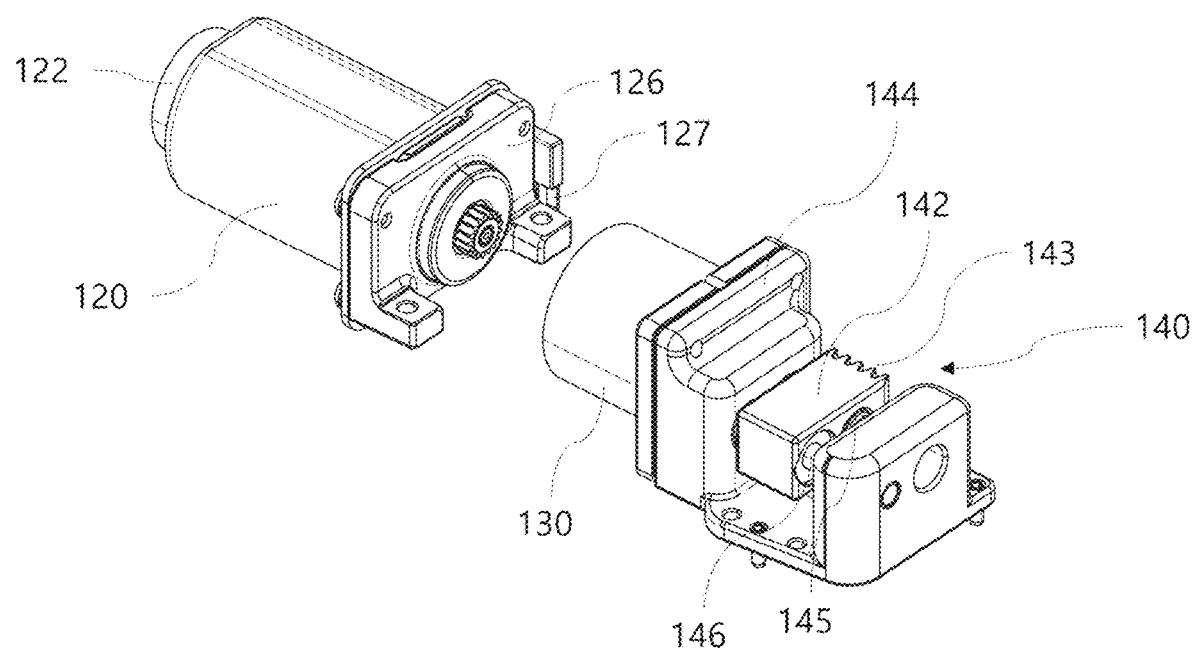
FIG. 3 is a diagram showing a state in which the drive motor, reducer, and movement unit of a parking lock actuator according to an embodiment of the present invention are coupled in series.

FIG. 1 is a perspective view of an electromechanical parking lock actuator according to an embodiment of the present invention, and FIG. 2 is a plan view of the electromechanical parking lock actuator of FIG. 1. FIG. 3 is a diagram showing a state in which the drive motor, reducer, and movement unit of a parking lock actuator according to an embodiment of the present invention are coupled in series.

Referring to FIGS. 1 to 3, an electromechanical parking lock actuator 100 according to an embodiment of the present invention is provided to move a parking latch that engages with the parking lock gear of the transmission of an automatic transmission vehicle or the parking lock gear of the transmission or reducer of or an electric vehicle. The electromechanical parking lock actuator 100 may include a housing 110, a drive motor 120, a reducer 130, a movement unit 140, and a printed circuit board 150.

The housing 110 may protect the drive motor 120, the reducer 130, the moving unit 140, and the printed circuit board 150 disposed therein, and may prevent a foreign substance or water from entering these components. The housing 110 may include a main body and a cover (not shown) coupled to the main body, and a seal member 112 configured to perform waterproofing may be provided at a portion where the main body and the cover come into contact with each other. The housing 110 may be mounted on the chassis of a vehicle, or the like.

The drive motor 120 is mounted within the housing 110 and is provided to generate rotational power. A motor mounting part 126 including a power supply connector 127 configured to supply power to the drive motor 120 may be provided on one side of the drive motor 120. The power supply connector 127 may be inserted and installed into and on a terminal 154 (see FIG. 4) provided on the printed circuit board 150. Furthermore, an annular elastic member 122 configured to reduce vibration and noise generated by the operation of the drive motor 120 may be provided on the other side of the drive motor 120. For example, the material of the elastic member 122 may be rubber.

One side of the reducer 130 is mounted on the drive motor 120, and the reducer 130 is provided to reduce the output speed of the drive motor 120. Due to the reducer 130, the output torque of the drive motor 120 may be increased. In the present embodiment, the reducer 130 may be a planetary gear. Accordingly, the drive motor 120 and the reducer 13 may be arranged in series. The output shaft of the drive motor 120 and the output shaft of the reducer 130 may be arranged on the same axis.

The movement unit 140 may be provided on the other side of the reducer 130. The movement member 142 of the movement unit 140 may be moved in a straight line by the rotational power of the drive motor 120. The movement unit 140 may also be arranged in series with the reducer 130. The moving unit 140 may include the movement member 142 configured to move in a straight line as the output shaft of the reducer 130 is rotated, and a guide part configured to guide the movement member 142 through straight-line movement while preventing the rotation of the movement member 142.

More specifically, the guide part may include a guide shaft 145 and a guide support 144. The guide shaft 145 has a thread formed on the outer peripheral surface thereof and the movement member 142 has a guide hole provided with a thread that engages with the thread of the guide shaft 145, so that the movement member 142 can move in a straight line as the guide shaft 145 is rotated. Furthermore, the guide support 144 may be provided in the form of a bracket, and may support the guide shaft 145 at both ends of the guide shaft 145. One side of the guide support 144 can be coupled to the other side of the reducer 130. The guide shaft 145 may pass through the guide support 144, may be connected to the output shaft of the reducer 130, and may rotate. Furthermore, the guide part according to an embodiment of the present invention may further include an auxiliary shaft 146. The auxiliary shaft 146 may be disposed parallel to the guide shaft 145, and may guide the movement member 142 through straight-line movement while preventing the rotation of the movement member 142. Furthermore, springs 147 (see FIG. 1) may be provided on the insides of both ends of the guide support 144 that supports the guide shaft 145. For example, the springs 147 may be leaf springs. Due to this structure, the jamming of the movement member 142 may be prevented.

Meanwhile, the parking lock actuator 100 according to an embodiment of the present invention may further include a rotation shaft 160. The rotation shaft 160 may engage with the movement member 142 through gear coupling, and may be rotated as the movement member 142 moves in a straight line. More specifically, a gear 143 may be provided on one side of the movement member 142, and the rotation shaft 160 may be provided with an arc portion 162 provided with a gear that engages with the gear 143 of the movement member 142. For example, the gear 143 of the movement member 140 may be a spur gear. The gear 143 of the movement member 142 may engage with the gear provided on the arc portion 162 of the rotation shaft 160. As the movement member 142 moves in a straight line, the rotation shaft 160 may be rotated clockwise or counterclockwise within a predetermined angular range around the rotation axis thereof.

The printed circuit board 150 may be provided with various electronic and electric components, such as a controller 152 configured to control the output of the drive motor 120. The controller 152 may control the operation of the electromechanical parking lock actuator 100 while communicating with the electronic control unit (ECU) of the vehicle. Furthermore, a rotation angle detection sensor configured to detect the rotation angle of the rotation shaft 160 may be provided on the printed circuit board 150. For example, the rotation angle detection sensor may be a dual-die sensor capable of generating two output signals. One signal may be an analog signal, and the other signal may be a pulse-width modulation (PWM) signal. The controller 152 may determine whether the rotation angle detection sensor functions erroneously by comparing the two output signals.

Figure 4:
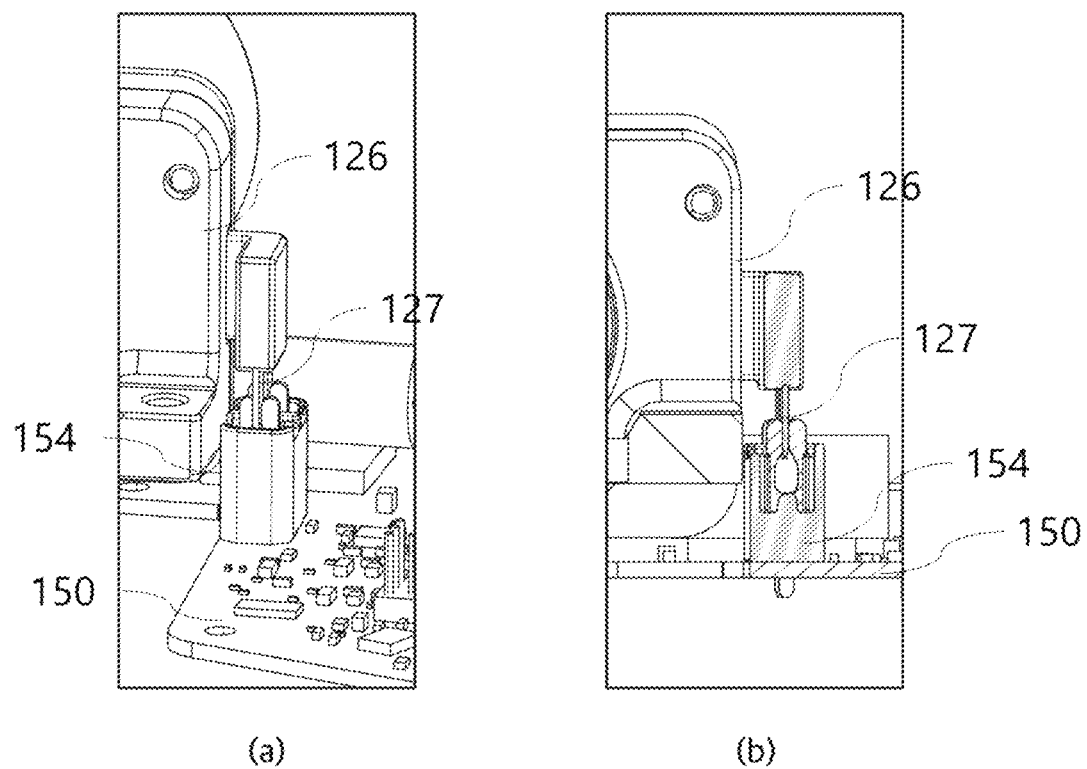
FIG. 4 is a diagram illustrating a state in which the drive motor of a parking lock actuator according to an embodiment of the present invention is mounted on a printed circuit board.

FIG. 4 is a diagram illustrating a state in which the drive motor of a parking lock actuator according to an embodiment of the present invention is mounted on a printed circuit board. FIG. 4 (*a*) is a perspective view, and FIG. 4 (*b*) is a sectional view.

Referring to FIG. 4, the motor mounting part 126 of the parking lock actuator 100 according to an embodiment of the present invention may include a power supply connector 127 configured to supply power to the drive motor 120. The power supply connector 127 may be provided in a pin-like shape, and may be inserted and mounted into and in a terminal 154 provided on a printed circuit board 150. Due to the coupling structure of the power supply connector 127 of the motor mounting part 126 and the terminal 154 of the printed circuit board 150, additional welding or soldering is not necessary, assembly work efficiency may be increased, and in case of a failure, an operator may easily separate the drive motor 120 from the printed circuit board 150.

Figure 5:
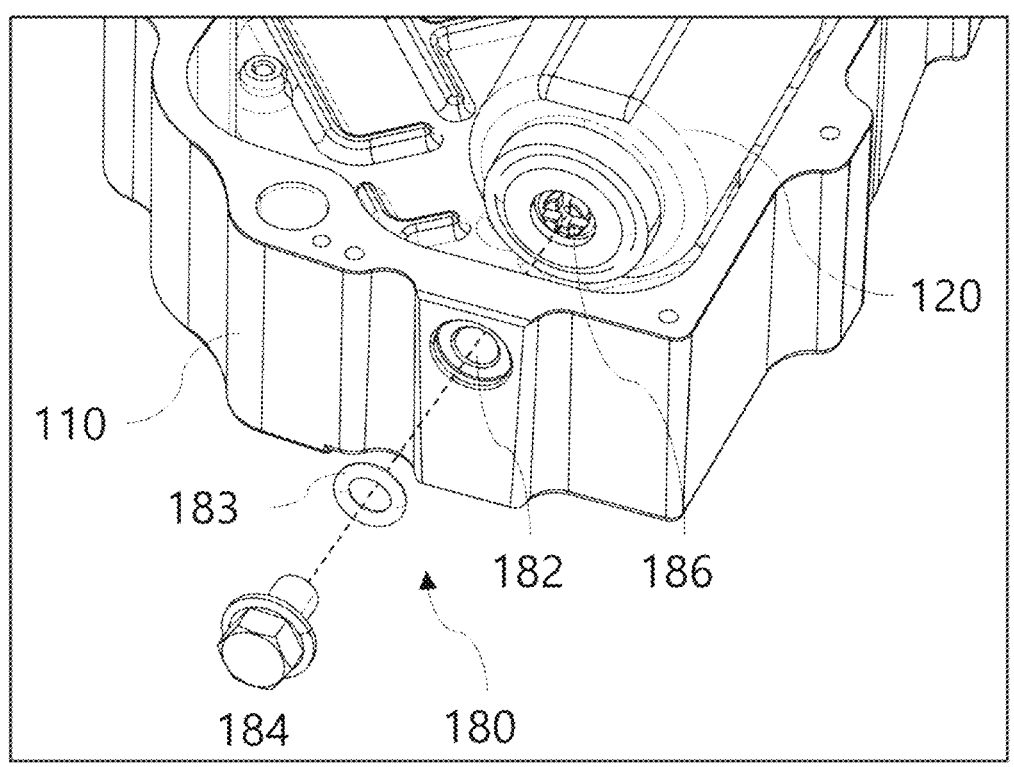
FIG. 5 is a diagram showing an emergency unlocking unit in a parking lock actuator according to an embodiment of the present invention.

FIG. 5 is a diagram showing an emergency unlocking unit in a parking lock actuator according to an embodiment of the present invention.

Referring to FIG. 5, a parking lock actuator 100 according to an embodiment of the present invention may further include an emergency unlocking unit 180.

The emergency unlocking unit 180 is provided to forcibly rotate a parking latch so that a parking lock can be forcibly released when there occurs an emergency situation in which the parking lock needs to be released in the state where a vehicle is parked. In the present embodiment, the emergency unlocking unit 180 may rotate a rotation shaft 160 to an unlocked position by forcibly rotating the rotation shaft of a drive motor 120.

The emergency unlocking unit 180 according to the present embodiment includes: a through hole 182 formed on one side of the housing 110 where the drive motor 120 is disposed, and configured to allow the rotation shaft of the drive motor 120 to be exposed; a stopper 184 detachably mounted on the housing 110, and configured to selectively block and expose the through hole 182; and an engagement shape part 186 provided on the head of the rotation shaft of the drive motor 120, and configured to be coupled with an external tool (not shown). A sealing member 183 such as an O-ring may be provided between the stopper 184 and the through hole 182 to prevent moisture or a foreign substance from entering the through hole 182. Furthermore, the engagement shape part 186 may have a straight or cross cut shape into which an external tool is fitted. In the emergency unlocking unit 180 according to an embodiment of the present invention, the rotation axis of the drive motor 120 may be rotated by separating the stopper 184 from the through hole 182 and engaging an external tool with the engagement shape part 186 via the through hole 182. Due to this structure, it may be possible to easily move the movement member 142 and rotate the rotation shaft 160 with a smaller amount of torque, compared to directly rotating the rotation shaft 160, which is the output side of power. Therefore, in an emergency situation, a driver or operator may easily release the parking status of the vehicle.

According to the above-described embodiment, the parking lock actuator can rotate the parking latch by moving the movement member of the movement unit with a small amount of power using the drive motor and the reducer and rotating the rotation shaft accordingly. Furthermore, the overall size of the parking lock actuator can be achieved by moving the movement unit in a straight line using rotational power through the reducer and arranging the drive motor, the reducer, and the movement unit in series. Moreover, in an emergency, the rotation shaft can be rotated to an unlocked position by simply inserting a tool via the through hole provided on one side of the housing and forcibly rotating the rotation shaft of the drive motor even with a small amount of force.

While the present invention has been described with reference to the embodiments shown in the drawings, these are merely examples. It will be understood by those having ordinary skill in the art to which the present invention pertains that various modifications and other equivalent embodiments may be made from the embodiments shown in the drawings. Therefore, the true scope of the present invention should be determined by the technical spirit of the attached claims.

What is claimed is:

1. An electromechanical parking lock actuator, comprising:
    a housing;
    a drive motor mounted within the housing, and configured to generate rotational power;
    a reducer provided in a planetary gear form, and configured such that one side thereof is mounted on the drive motor and it reduces output speed of the drive motor;
    a movement unit provided on a remaining side of the reducer, and configured to convert movement of a movement member into straight-line movement by using the rotational power of the drive motor; and
    a printed circuit board provided with a controller that controls output of the drive motor,
    wherein the movement unit comprises:
        a movement member configured to move in a straight line as an output shaft of the reducer is rotated; and
        a guide part configured to guide the movement member through straight-line movement while preventing rotation of the movement member.

2. The electromechanical parking lock actuator of claim 1, wherein the drive motor, the reducer, and the movement unit are arranged on a same axis.

3. The electromechanical parking lock actuator of claim 1, wherein the guide part comprises:
    a guide shaft provided with a thread on an outer peripheral surface thereof; and
    a guide support configured to support the guide shaft at both ends of the guide shaft, and also configured such that one side thereof is coupled to the remaining side of the reducer,
    wherein the guide shaft passes through the guide support, is connected to the output shaft of the reducer, and rotates, and
    wherein the movement member moves in a straight line on the guide shaft as the guide shaft is rotated.

4. The electromechanical parking lock actuator of claim 3, wherein the guide part further comprises an auxiliary shaft disposed parallel to the guide shaft and configured to guide the movement member through straight-line movement while preventing rotation of the movement member.

5. The electromechanical parking lock actuator of claim 3, wherein springs are provided on insides of both ends of the guide support for supporting the guide shaft, respectively.

6. The electromechanical parking lock actuator of claim 1, further comprising:
    a motor mounting part configured to mount the drive motor within the housing and provided with a power supply connector for supplying power to the drive motor,
    wherein the power supply connector is inserted and mounted into and in a terminal that is provided on the printed circuit board.

7. An electromechanical parking lock actuator, comprising:
    a housing;
    a drive motor mounted within the housing, and configured to generate rotational power;
    a reducer provided in a planetary gear form, and configured such that one side thereof is mounted on the drive motor and it reduces output speed of the drive motor;
    a movement unit provided on a remaining side of the reducer, and configured to convert movement of a movement member into straight-line movement by using rotational power of the drive motor;
    a rotation shaft coupled to the movement member in a gear coupling manner, and configured to be rotated by movement of the movement member; and
    an emergency unlocking unit configured to rotate the rotation shaft to an unlocked position by forcibly rotating a rotation shaft of the drive motor in an emergency.

8. The electromechanical parking lock actuator of claim 7, wherein the emergency unlocking unit comprises:
    a through hole formed on one side of the housing where the drive motor is disposed, and configured such that the rotation shaft of the drive motor is exposed therethrough;
    a detachable stopper configured to selectively close and expose the through hole; and
    an engagement shape part provided on a head of the rotation shaft of the drive motor, and configured to be coupled with an external tool.

9. The electromechanical parking lock actuator of claim 8, wherein a sealing member is provided between the through hole and the stopper to provide sealing.

10. The electromechanical parking lock actuator of claim 8, wherein the engagement shape part has a straight or cross cut shape into which the external tool is fitted.

* * * * *